Oct. 22, 1935.  O. D. BOARDMAN  2,017,939
VEHICLE ACTUATED GATE
Filed April 17, 1935   3 Sheets-Sheet 1

Inventor

*O. D. Boardman,*

By *Clarence A. O'Brien*
Attorney

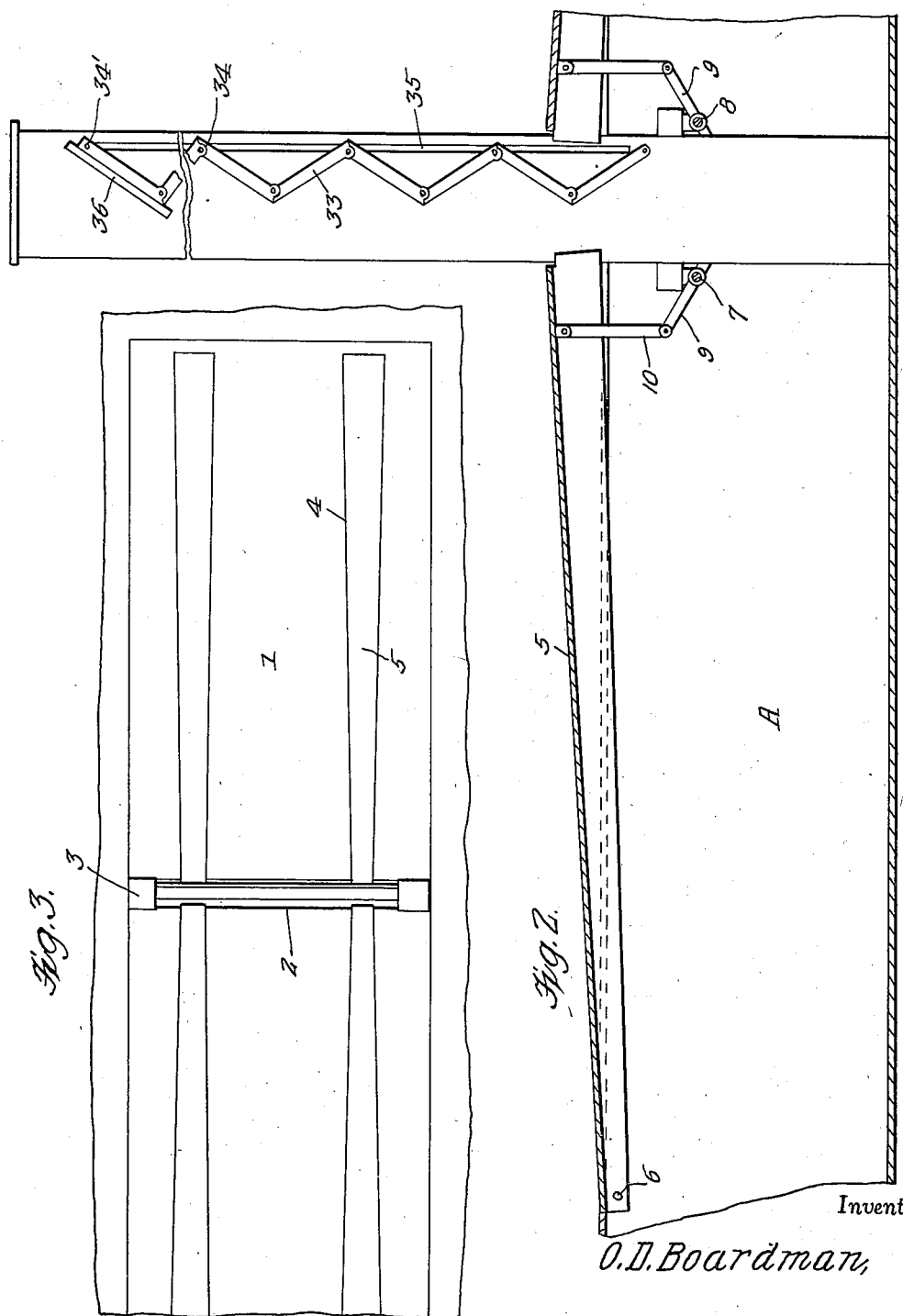

Oct. 22, 1935.                O. D. BOARDMAN                2,017,939
                             VEHICLE ACTUATED GATE
                             Filed April 17, 1935           3 Sheets-Sheet 3
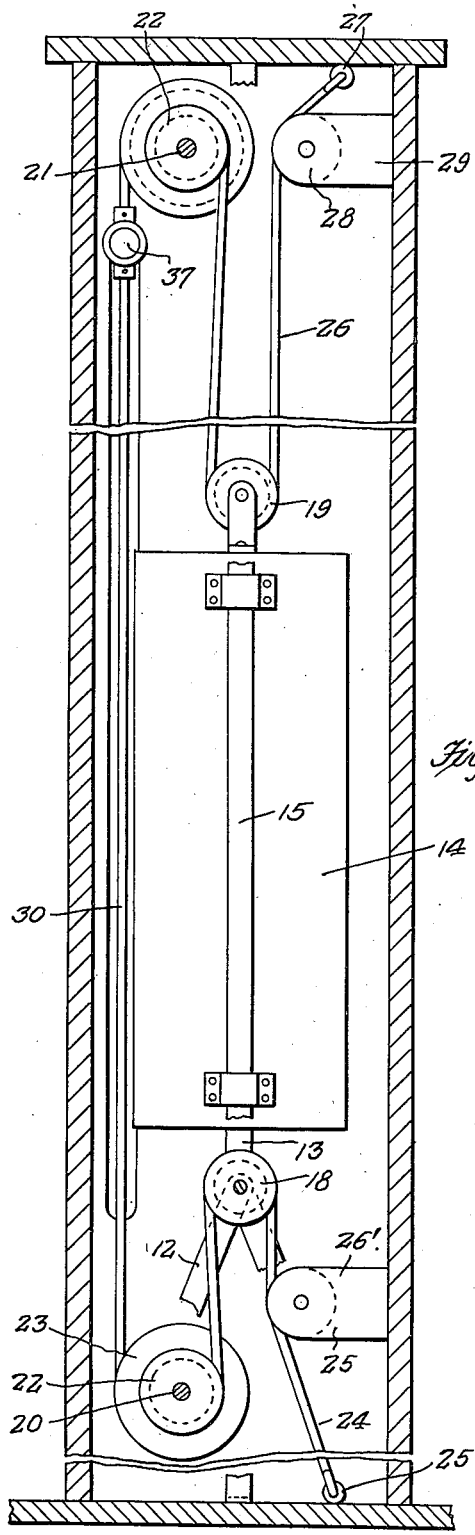
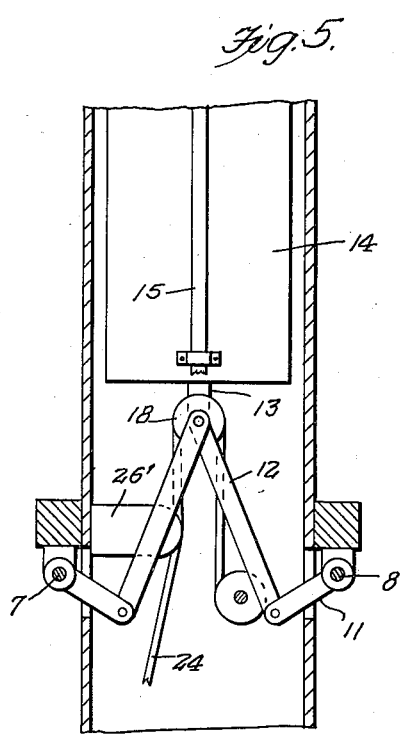
Fig. 5.
Fig. 4.
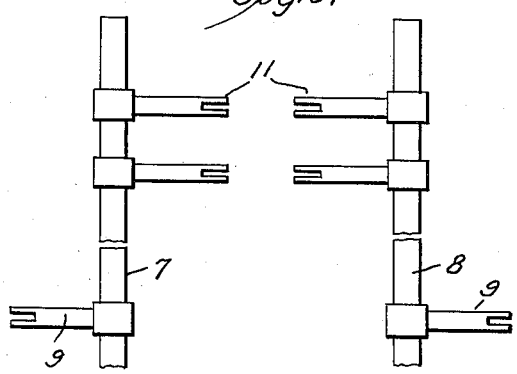
Fig. 6.
Inventor
O. D. Boardman,
By Clarence A. O'Brien
                    Attorney Patented Oct. 22, 1935

2,017,939

UNITED STATES PATENT OFFICE 2,017,939

VEHICLE ACTUATED GATE

Odessa D. Boardman, Chester, Tex.

Application April 17, 1935, Serial No. 16,873

4 Claims. (Cl. 39—1)

This invention relates to a vehicle actuated gate, the present invention being an improvement over that forming the subject matter of a patent granted to me on January 22, 1935, No. 1,988,889.

The general object of the present invention is to provide a weight structure raised by the lowering of the treadles by a vehicle with a pulley and belt assembly for imparting movement to the toggle lever gate assembly, the weights of course acting to raise the gate after the vehicle has passed through the gate opening.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a vertical longitudinal view with parts in elevation.

Figure 3 is a plan view showing the gate assembly in a roadway.

Figure 4 is a longitudinal sectional view through one of the posts shown in Figure 1 with the interior parts in elevation.

Figure 5 is a section on the line 5—5 of Figure 1.

Figure 6 is a fragmentary plan view of the two treadle operating shafts and their crank arms.

Figure 1:
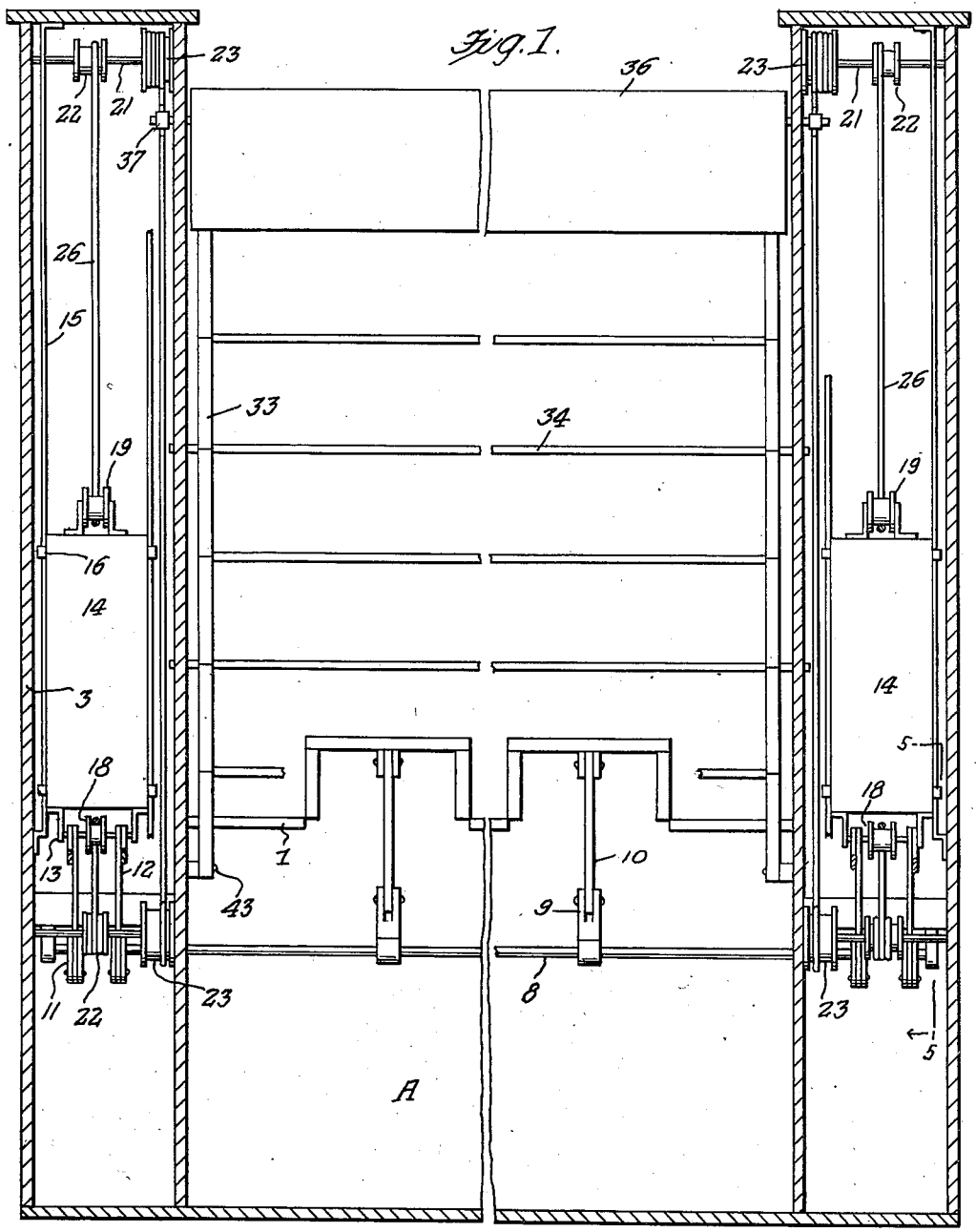
Figure 1 is an elevation of the improved gate with parts in section.

In these drawings the letter A indicates a longitudinally extending casing placed in the roadway and the top 1 of which forms a continuation of the roadway, said top being formed with the transverse slot 2 and hollow posts 3 are located one at each end of the slot and pass therethrough and the lower ends of the posts suitably connected with the casing. A pair of spaced longitudinally extending slots 4 are formed in each part of the top and a treadle I is arranged in each slot, each treadle being pivoted to a part of the casing as shown at 6 at that end of the treadle which is remote from the slot. Each treadle is so arranged that a vehicle traveling over the top will have its wheels ride over the treadle so that the treadle will be depressed.

A pair of transversely extending rock shafts 7 and 8 are journaled in the casing one at each side of a pair of posts and each shaft has an outwardly extending arm 9 thereon spaced from each end thereof and links 10 connect the two arms of each shaft with the inner ends of each pair of treadles so that when a pair of treadles is depressed the shaft will be rocked.

A pair of arms 11 is connected to each end part of each shaft 7 and 8 and two sets of links 10 12 connect these arms 11 of the two shafts with a yoke 13 depending from the lower ends of weights or weight boxes 14 supported for vertical movement in the posts by the guides 15 engaging the eye members 16 attached to the boxes 15 or weights. Thus when a pair of treadles is depressed one of the shafts 7 and 8 will be rocked and this rocking movement will cause the links 12 connected with the arms 11 of said shaft to raise the weights and as it will be seen from Figure 5 this movement will be imparted to the other shaft through the other set of links 12 and the arms 11 of the shaft. Thus it will be seen that when one pair of treadles is depressed the other pair will be depressed by means of the two shafts 25 7 and 8 and the arms 11 and the links 12.

A drum or pulley 18 will be carried by each yoke 13 and a drum or pulley 19 is rotatably supported at the upper end of each weight. A shaft 20 is rotatably arranged in the lower part of each 30 post and a shaft 21 is rotatably arranged in the top of each post and each shaft carries a pulley 22 and a drum 23. A cable 24 has its lower end attached to the bottom of each post as shown at 25 and said cable passes upwardly over a guide 35 pulley 26' carried by a bracket 27 in each post and around the pulley or drum 18 then downwardly around the pulley 22 on the lower end of the post, the cable being wrapped a plurality of times around the pulley 22 and having its end connected with the pulley. A second cable 26 has one end attached to the top of the post as shown at 27 and passes downwardly over a guide pulley 28 carried by a bracket 29 and then the cable passes around the pulley 19 connected with the 45 top of the weights and then passes upwardly and is wrapped a plurality of times around the upper pulley 22 on the shaft 21. A cable 30 has its ends connected with the drums 23 of the shafts 20 and 21 after being wrapped around said drums, these 50 parts being so arranged that as a weight 14 is pushed upwardly as before described the cable 24 will unwind from the pulley 22 and thus rotate the shaft 20 so as to cause the drum 23 to wind the cable 30 thereon and this pull upon the cable 55

30 will cause the upper drum 23 of the shaft 21 to rotate the shaft 21 as the cable is unwinding from the upper drum 23 and thus the upper pulley 22 will be rotated to wind the cable 26 thereon. Of course, as the weights descend the reverse motion of the cables will occur and the cable 30 will be wound upon the upper drum while it is unwinding from the lower drum 23 and the lower cable 24 will be thus wound upon the pulley 22 and the cable 26 unwinding from the upper pulley 22.

The gate proper is composed of the two sets of toggle links 33 and the spaced bars 34 extending across the space between the two sets of toggle links and these bars from the pivots for alternate pairs of links as shown in Figure 2. Some of the bars have their ends extended to pass through the vertical slots 35 in the inner faces of the posts and a board 36 is connected to the top links and acts to close the slot when in lowered position and rests upon the inner ends of the treadles so that the wheels of a vehicle can readily pass from one pair of treadles to the other pair over this board when the gate is lowered. The top pivot 34' or top cross bar extends through the slots 35 and has its ends connected with the cables 30 as shown at 37 so that the movement of these cables 30 will raise and lower the gate.

Figure 7:
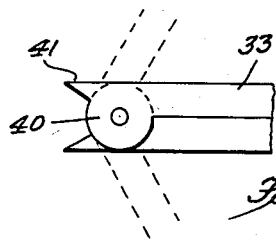
Figure 7 is a view of a pair of toggle links.

Each pair of toggle links have overlapping portions 40 of substantially circular shape as shown in Figure 7 with a substantially V-shaped projection 41 extending from each circular portion so that these projections will engage each other and thus limit opening movement of the links as shown in dotted lines in Figure 7. The lower link of each set is pivoted to the post as shown at 43.

Thus it will be seen that the vehicle approaching the closed gate will run over a pair of treadles and depress said pair and this depression of the pair of treadles will operate the parts so that the other pair will be depressed and the upward movement of the weights 14 will operate the cables 30 to lower the gate, the gate passing into the casing between the two posts until the board 36 will close the space between the inner ends of the two sets of treadles so that the wheels of the vehicle can pass readily from one pair of treadles to the other pair. Then when the rear wheels of the vehicle leave the said other pair of treadles the weights 14 will descend by gravity and this action of the weights will operate the cables 30 in a reverse direction so that the gate will be raised.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A vehicle actuated gate comprising a pair of hollow posts, a weight in each post, upper and lower drums in each post, a cable having its ends connected to said drums, a gate including a pair of lazytongs structures and cross bars connecting said structures together, means for connecting the upper part of the gate to the cables, shafts journaled in the posts and connected with the drums, a pulley on each shaft, a pulley at each end of each weight, an upper cable having one end connected to the top of the post and passing around the top pulley of each weight and having its other end connected to the pulley of the top shaft, a second cable having its one end connected to the bottom of the post and passing around the pulley at the lower end of each weight and having its other end connected to the pulley of the lower shaft and treadle means for raising the weights by a vehicle approaching the gate, said means including means for depressing the other treadle means when the first treadle means are depressed.

2. A vehicle actuated gate comprising a casing having its top forming part of a roadway, said top having a transverse slot therein, a pair of hollow posts passing through the ends of the slot, said top having longitudinal extending slots therein, treadles in the slots and pivotally supported from the casing at their outer ends, a pair of shafts journaled in the casing one at each side of the slot, outwardly extending arms on the shafts, links connecting said arms to the treadles, a weight in each post, inwardly extending arms on the shafts, links pivoted to the inwardly extending arms and to the lower ends of the weights, upper and lower shafts in each post, a pulley and a drum carried by each shaft, a pulley at each end of the weights, cables connected at one end to the posts and passing over the pulleys of the weights and connected with the pulleys of the shafts, another cable wound upon the two drums, a gate including a pair of lazytongs structures and spaced bars connected with said structures and means for connecting the top part of the gate to the last-mentioned cable, the posts having vertical slots therein through which portions of the gate pass.

3. A vehicle actuated gate comprising a casing having its top forming part of a roadway, said top having a transverse slot therein, a pair of hollow posts passing through the ends of the slot, said top having longitudinal extending slots therein, treadles in the slot and pivotally supported from the casing at their outer ends, a pair of shafts journaled in the casing one at each side of the slot, outwardly extending arms on the shafts, links connecting said arms to the treadles, a weight in each post, inwardly extending arms on the shafts, links pivoted to the inwardly extending arms and to the lower ends of the weights, upper and lower shafts in each post, a pulley and a drum carried by each shaft, a pulley at each end of the weights, cables connected at one end to the posts and passing over the pulleys of the weights and connected with the pulleys of the shafts, another cable wound upon the two drums, a gate including a pair of lazytongs structures and spaced bars connected with said structures and means for connecting the top part of the gate to the last-mentioned cable, the posts having vertical slots therein through which portions of the gate pass, a board forming the top member of the casing and closing the transverse slot in the top of the casing when the gate is in lowered position.

4. A vehicle actuated gate comprising a pair of hollow posts, a weight in each post, upper and lower drums in each post, a cable having its ends connected to said drums, a gate including a pair of lazytongs structures and cross bars connecting said structures together, means for connecting the upper part of the gate to the cables, shafts journaled in the posts and connected with the drums, a pulley on each shaft, a pulley in each end of each weight, an upper cable having one end connected to the top of the post and passing around the top pulley of each weight and having its other end connected to the pulley of the top shaft, a second cable having its one end connected to the bottom of the post and passing around the pulley at the lower end of each weight and having its other end connected to the pulley of the lower shaft and treadle means for raising the weights by a vehicle approaching the gate, said means including means for depressing the other treadle means when the first treadle means are depressed, each lazytongs structure including links having circular portions at their ends with the circular portions of each pair of links overlapping and each pair having projections at their ends formed with beveled inner sides for limiting opening movement of the links.

ODESSA D. BOARDMAN.